United States Patent [19]

Dearden et al.

[11] Patent Number: 4,629,222
[45] Date of Patent: Dec. 16, 1986

[54] PIPE CONNECTOR

[75] Inventors: Geoffrey C. Dearden; Edward J. Speare, both of Bedford; Katsuo Ueno, Hertfordshire, all of England; Donald N. Jones, Aberdeenshire, Scotland

[73] Assignee: Hunting Oilfield Services (UK) Limited, Aberdeen, Scotland and Kawasaki Steel Corporation, Kobe, Japan

[21] Appl. No.: 645,047

[22] Filed: Aug. 28, 1984

[30] Foreign Application Priority Data

Aug. 31, 1983 [GB] United Kingdom ............... 8323349

[51] Int. Cl.$^4$ ............................................. F16L 15/00
[52] U.S. Cl. ............................... 285/332.4; 285/334; 285/390; 411/413; 411/263; 403/47
[58] Field of Search ................. 285/332.4, 333, 334, 285/334.4, 355, 390, 391, 175; 403/47; 411/413, 290, 263

[56] References Cited

U.S. PATENT DOCUMENTS

| 720,578 | 2/1903 | Greenfield | 285/175 |
|---|---|---|---|
| 2,318,398 | 5/1943 | Hungerford | 411/263 |
| 3,050,318 | 8/1962 | van der Wissel | 285/334 |
| 3,210,096 | 10/1965 | van der Wissel | 285/334 |
| 3,994,516 | 11/1976 | Fredd | 285/175 |
| 4,113,290 | 9/1978 | Miida | 285/334 |
| 4,121,862 | 10/1978 | Greer | 285/333 |
| 4,346,920 | 8/1982 | Dailey | 285/334 |
| 4,423,893 | 1/1984 | Holmes | 285/334 |

FOREIGN PATENT DOCUMENTS

48111 11/1951 United Kingdom ............... 285/333

Primary Examiner—Cornelius J. Husar
Assistant Examiner—Eric K. Nicholson
Attorney, Agent, or Firm—Balogh, Osann, Kramer, Dvorak, Genova & Traub

[57] ABSTRACT

A connector, for example for connecting a tubular member such as a pipe, comprises a male member which has an external frusto-conical surface provided with a thread and a female member having an internal frusto-conical surface provided with a thread for engagement with the thread of the male member. The members are provided with sealing surfaces which are brought into sealing abutment under an axially directed compressive force when the members are fully engaged together, as a result of which one member, as shown in FIG. 3 the male member, is partly compressed and the other member, as shown in FIG. 3 the female member, is partly tensioned. To improve the loading of the threads of the members when the members are fully engaged together and under an applied tensile load, the threads of the members are divided into three portions, an intermediate portion and end portions, the pitches of the threads in the three portions are the same and constant throughout their axial extents but the relative phases of the threads in the end portions differ. Specifically the phase angle of the threads in the intermediate portion is the same. In the end portion adjacent the sealing surfaces, the phase of the thread of the member (which was placed under compression during make-up) is advanced relative to that of the other member, and in the other end portion the phase of the thread of the other member is advanced relative to that of the one member.

19 Claims, 12 Drawing Figures

FIG_7

FIG_8

FIG_9

FIG. 10A

(Normal screw)

FIG. 10B (Change of phase)

FIG. 10C (Change of pitch)

PIPE CONNECTOR

BACKGROUND OF THE INVENTION

1. Field of the Invention

The present invention relates to connectors for connecting members, such for example as pipe connectors for connecting pipes particularly but not exclusively for use in conveying pressurized fluids for example in oil and gas exploration and production.

2. Description of the Prior Art

The main type of connector presently used in oil and gas exploration and production for connecting tubings and casings comprises a female member having an internal frusto-conical circumferential surface provided with a thread of constant pitch, and a male member having an external correspondingly frusto-conical circumferential surface and provided with a thread having the same pitch as the thread of the female member and for threaded engagement with the female member. Sealing of the connector is obtained by causing a generally axially directed sealing surface on the free end of the male member to abut against a corresponding sealing surface of the female member under an axial compressive force. This force is obtained by screwing the members together tightly causing compression of the male member and extension of the female member and is usually maintained by providing an interference fit between crest and root surfaces of the threads.

Pipe connectors of this type have been found to have a number of substantial disadvantages. The axial compressive stress in the male member and the associated tensile stress in the female member, required to force the sealing surfaces into sealing contact, is borne predominantly by only the last few turns of the thread adjacent the sealing surfaces, the remainder of the turns of the threads being at most very light loaded. Consequently the load bearing leading flanks of the loaded turns of the thread experience substantial loads while sliding relative to one another to bring the sealing surfaces into compressive contact. Additionally, while increasing the radial interference between the threads of the members will reduce the tendency of the members to unscrew or back-off, the resulting hoop stresses in the female member, particularly when increased under the influence of internal pressure, can exceed the stresses at which the material of the member will yield. Furthermore, high hoop stresses and high flank loading can produce galling of the flank and crest and root surfaces of the threads.

The relatively short axial distance between the load bearing turns of the threads and the sealing surfaces limits the strain energy induced in the members so that a slight relative axial movement of the members of the connector can significantly reduce the integrity of the seal between the sealing surfaces. Not only is the strain energy limited but also the angle through which the members are rotated in producing the sealing force on the sealing surfaces is limited so that any slight tendency of the members to back-off, for example resulting from a lateral blow to one of the members, will cause a significant reduction in the compressive loading of the sealing surfaces.

SUMMARY OF THE INVENTION

It is a primary object of the invention to provide an improved pipe connector which eliminates all the disadvantages above described.

It is another object of the invention to provide a pipe connector capable of uniformly distributing load such as tensile or compressive forces acting upon male and female members of the connector to greatly reduce the maximum load on flanks of turns of threads formed in the members, thereby enhancing the fatigue life of the connector.

It is a further object of the invention to provide a pipe connector capable of uniformly distributing load such as tensile or compressive forces acting upon male and female members of the connector so as to rotate the members through a substantially greater angle than with the known connector to achieve a required loading on sealing surfaces of the members, thereby preventing loss of integrity of seal provided by sealing surfaces only by a relatively small angular rotation of the members.

According to one aspect of the present invention there is provided a connector including a female member having an internal circumferential surface provided with a thread, and a male member having an external circumferential surface provided with a thread for threaded engagement with the thread of the female member, the male member being provided adjacent one end of the threaded surface thereof with an annular sealing surface which lies in a plane substantially perpendicular to the central axis of the connection of the male and female members, when the male and female members are fully engaged together, and which is brought into abutment with an annular sealing surface associated with the female member, which also lies in a plane substantially perpendicular to the central axis of the connection of the male and female members, under an axially directed force, wherein the threads of the members comprise an intermediate portion intermediate the ends of the threads and one end portion extending between the intermediate portion and the one ends of the threads adjacent the sealing surfaces, wherein the intermediate and one end portions of the threads have the same pitch throughout their axial extents, but the relative phase of the threads of the members changes between the intermediate portion and the one end portion such that, as the members are screwed together, on abutment of the sealing surfaces, part at least of one leading flank of the thread of one member abuts the corresponding part of the leading flank of the thread of the other member in the intermediate portion, and, as the axial force on the sealing surfaces increases, the leading flanks of the threads of the members in the intermediate portion are progressively loaded and the leading flanks of the threads of the members in the one end portion are progressively brought into abutment and loaded.

According to another aspect of the present invention there is provided a connector including a female member having an internal circumferential surface provided with a thread, and a male member having an external circumferential surface provided with a thread for threaded engagement with the thread of the female member, the male member being provided adjacent one end of the threaded surface thereof with an annular sealing surface which lies in a plane perpendicular to a central axis of the connection of the male and female members, when the male and female members are fully engaged together, and which is brought into abutment with an annular sealing surface associated with the female member, which lies in a plane substantially perpendicular to the central axis of the connection of the male and female members, under an axially directed force which places part at least of one member in compression and part at least of the other member in tension, wherein the threads of the members comprise an intermediate portion intermediate ends of the threads and one end portion extending between the intermediate portion and the one ends of the threads adjacent the sealing surfaces, the pitch of the threads of the members in the intermediate and one end portions are the same and constant throughout their axial extents but, in the one end portion, the phase of the thread of the one member is advanced relative to that of the other member.

The male member may be formed on the end of a member to be connected thereby or may be made separately and may be fixed, for example permanently, e.g. by welding, or otherwise to the end of the member, and the female member similarly may be formed on the end of a member to be connected thereby or may be made separately and fixed or otherwise connected to the member. The female member may be made integral with or otherwise fixed to part of another connector for connection to the member. When the female member is made separately, the sealing surface associated therewith may be provided either by a surface of the member itself or by a surface of a member already engaged with the female member.

The circumferential surfaces of the members may be cylindrical or correspondingly frusto-conical.

The sealing surfaces may be provided at or adjacent the free end of the male member and internally in the female member, or may be provided at or adjacent the free end of the female member and by an external surface on the male member. The sealing surfaces may extend in radial planes or may be frusto-conical or curved, e.g. convex or concave, or in part radial and/or frusto-conical and/or curved. The surfaces may have the same shape or may be differently shaped and deformed into full abutment on full engagement of the members. For example the sealing surfaces may be as described in either of copending applications Nos. 8323508 and 8414203.

The thread of one of the members may have a constant phase angle in the intermediate and one end portions, with the phase angle of the thread of the other member changing, i.e. being advanced or rotated, between the intermediate and one end portions.

For example, for a connector where the male member sealing surface is provided at or adjacent the free end of the male member, the phase angle of the thread of the female member may be constant over the intermediate and the one end portions, the phase angle of the thread of the male member being advanced between the intermediate portion and the one end portion. Alternatively the phase angle of the thread of the male member may be constant, with that of the thread of the female member being retarded between the intermediate and one end portions.

To improve the distribution of the load along the threads, on application of an axial tensile load to a made-up connector, the threads of the members may comprise another end portion between the intermediate portion and the other ends of the threads, the pitch of the thread in the other end portion being the same as that of the intermediate and one end portions but the phases of the threads in the other end portion may be different. The phase change may be such that a substantial part at least of the axial tensile force will be taken by at least some of the thread turns in the intermediate portion. To obtain this, the phase change in the other end portion is such that the leading flanks of the threads of the members are slightly spaced apart, in the absence of an axial tensile force.

The required phase change is obtained by advancing the phase of the thread of the member which, on make-up of the members and in the absence of an axial tensile load, is in tension relative to that of the member which is under compression.

Advantageously, the phase of the thread of one of the members is constant in the intermediate and other end portions and the phase of the thread of the other of the member is changed, i.e. advanced or retarded as required, between the intermediate and other end portion.

Preferably, the phase of the thread of one of the members is constant in the intermediate and one end portion and the phase of the thread of the other of the members is constant in the intermediate and other end portions.

An annular groove may be provided in one or both of the members in the region of a junction between the thread portion and the or each groove may house a resiliently compressible seal against which a turn of the thread of the other member bears, to provide a secondary seal supplementing that provided by abutment between the sealing surfaces.

The threads of the members are advantageously shaped to provide a clearance between the other trailing flanks of the threads, when the members are not under an axial compressive load, and, when the members are fully engaged together, clearance, contact or interference may be provided between the crest surface of one thread and the root surface of the gap between adjacent turns of the other thread.

Preferably a clearance is provided between the crest surface of the other thread and the root surface of the gap between adjacent turns of the one thread.

Embodiments according to the present invention will now be described by way of example only, with reference to the accompanying drawings.

DETAILED DESCRIPTION OF THE PREFERRED EMBODIMENT

Figure 1:
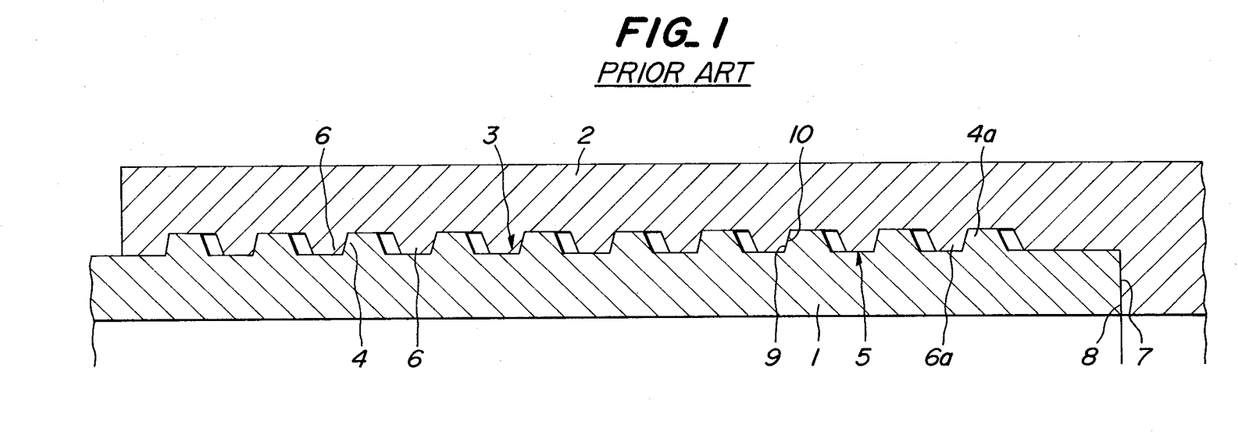
FIG. 1 is a diagrammatic part sectional view of a known type of pipe connector.

The known pipe connector shown very diagrammatically in FIG. 1 comprises a male member 1 which is made or formed integrally with the end of the pipe, and a female member 2 which forms part of a sleeve, and the other end of which is similarly associated with another male member. The male member 1 has an external frusto-conical surface 3 provided with a thread 4 having a constant pitch throughout its length. The female member 2 has an internal frusto-conical surface 5 corresponding to surface 3 and provided with a thread 6 having the same pitch as thread 4. The free end of male member 1 has an annular radial sealing surface 7 which, when the members are fully engaged together is in abutment with an internal annular radial surface 8 on the female member 2.

To make up the above connector, the members 1, 2 are screwed together until the surfaces 7, 8 are brought into abutment, at which point the leading flanks 9, 10 of the threads 4, 6 respectively are also in abutment. The members are then further screwed together to load the abutted surfaces 7, 8. The reactive force is mainly taken by the leading flanks 9, 10 of the first turn 4a, 6a of the threads 4, 6 with substantially less load being taken by the second, third, etc. turns. The dotted lines 11 of FIG. 2 shows load taken by the thread turns.

The effect of loading surfaces 7, 8 is to compress the male member (and correspondingly tension the female member) and thereby store energy. However, the main compression and extension takes place between those thread turns which bear the substantial part of the load and the sealing surfaces 7, 8, and therefore a relatively short length at the free end of the male member is compressed to any substantial degree.

Because of this disadvantageous load distribution along the threads 4, 6 as described above, the relative angle through which the members are rotated to achieve full loading of the surfaces 7, 8 is relatively small. It will thus be appreciated that a relatively small angular rotation of the members tending to unscrew the members will substantially reduce the integrity of the seal provided by surfaces 7 and 8, as described above. The resistance to unscrewing is provided by friction between the leading flanks of the threads and is usually increased by providing an interference fit between the crest and root surfaces of the threads, but again there is a limit to the degree of interference that can be provided because of the consequential hoop stresses in the members and the risks of galling of the flank crest and root surfaces of the threads.

Figure 2:
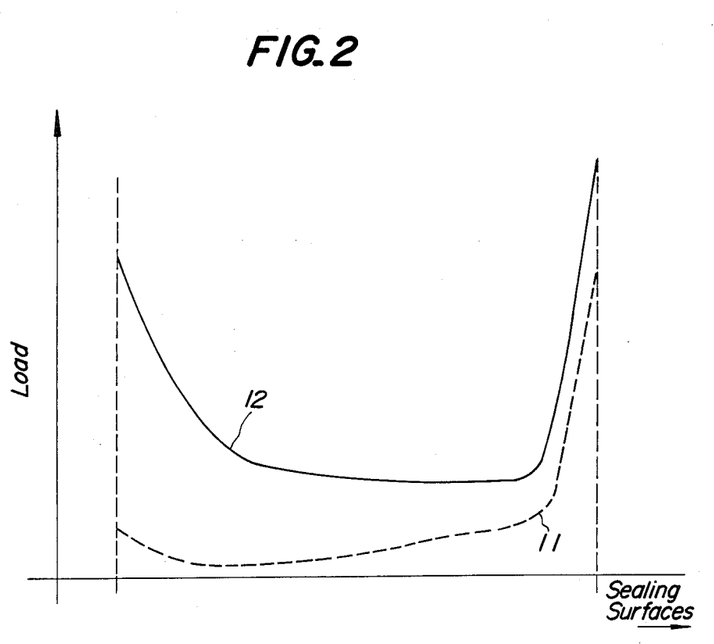
FIG. 2 is graph showing the load on each thread turn for the pipe connector of FIG. 1.

Finally, when the above connector is subject to an axial tensile stress, the effect is mainly borne by the turns of the threads at the two ends of the threaded surfaces, as shown by the full line 12 in FIG. 2. Particularly where one of the two members has, at the end remote from the surfaces 7, 8 a vanishing thread so that the area of contact between the leading flanks of the thread is substantially reduced particularly in the last few turns, the imposition of substantial loads on application of an axial tensile force can cause the female member to "unzip" or deform radially outwardly providing the potential for failure of the connector.

Figure 3:
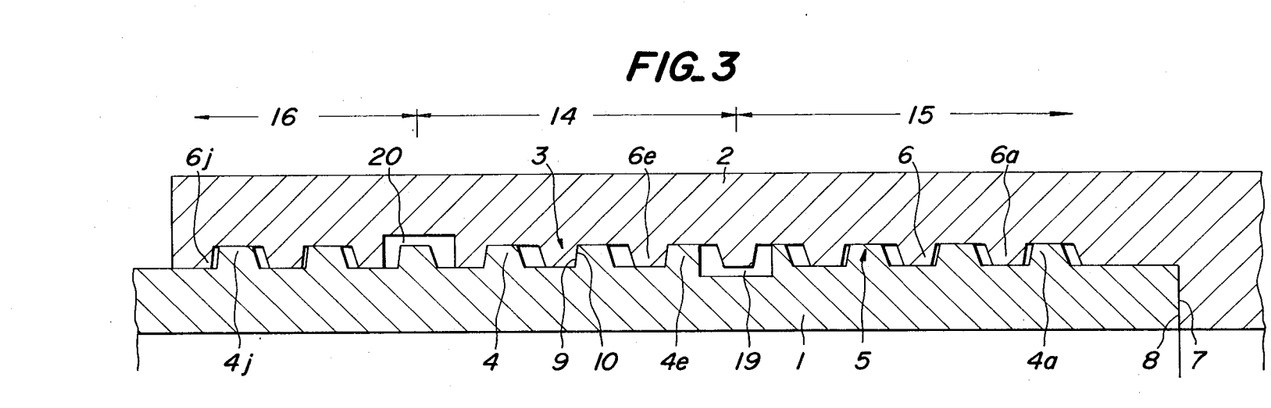
FIG. 3 is a diagrammatic part sectional view of an embodiment of pipe connector according to the present invention.

An embodiment of a connector according to the present invention for connecting pipes is shown diagrammatically in FIG. 3 and parts corresponding to those of the known connector of FIG. 1 are designated by the same reference numerals. Specifically, the connector comprises a male member 1 provided with an external peripheral frusto-conical surface 3 which is provided with a thread 4, and a sealing surface 7, and a female member 2 provided with an internal circumferential frusto-conical surface 5 with a thread 6, and a sealing surface 8. The threaded surfaces comprise three portions, an intermediate portion 14 and two end portions 15, 16 between the intermediate portion 14 and sealing surfaces 7, 8, and the other end of the threaded surfaces respectively. The pitches of the threads 4, 6 are the same and are constant in portions throughout the axial extents of the portions of the threaded surfaces. However the phase angle of one of the threads in each of the end portions 15 and 16 changes relative to the other thread to modify load take-up of the threads.

Specifically, in portion 15, the phase of thread 4 is advanced relative to that of thread 6 and relative to thread 4 in the intermediate portion 14, although exactly the same effect can be achieved by retarding the phase of thread 6 in portion 15 relative to that of thread 4 and to that of thread 6 in portion 14. In portion 16 the phase of thread 6 is advanced relative to that of thread 4 and to that of thread 6 in portion 14, although again, the same effect can be achieved by retarding the phase of thread 4 in portion 16 relative to that of thread 6 and that of thread 4 in portion 14.

The above described phase changes can be achieved by, or regarded as the consequence of, a local change in pitch of the relevant thread between the portions concerned. A phase is advanced by a local pitch increase and a phase is retarded by a local pitch reduction.

Figure 4:
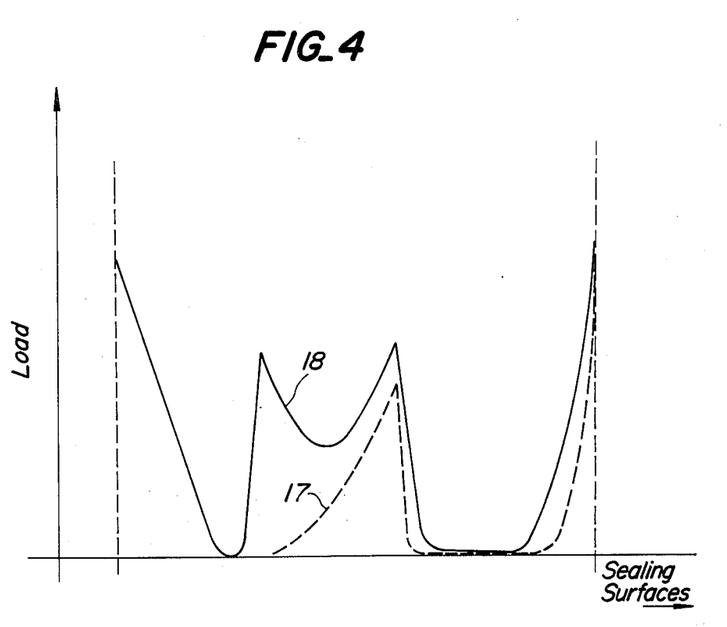
FIG. 4 is a graph showing the load on each thread turn for a pipe connector as shown in FIG. 3.

With the above described arrangement, when the members 1, 2 have been screwed together to bring surfaces 7, 8 into abutment, at least a part of the leading flanks 9, 10 of the threads in the central portion 14 are in abutment. Further tightening of the connector will load these flank surfaces starting first with turns 4e, 6e at the end of the central portion 14 closest to surfaces 7, 8 and will then load the load bearing flanks 9, 10 of the threads in portion 15 starting with the first turns 4a, 6a, as shown by the broken line 17 in FIG. 4. In loading surfaces 7, 8, the end portion of the male member is compressed (and the corresponding portion of the female member is tensioned). The load on surfaces 7, 8 is borne not only by the turns of the threads in portion 15 but also in portion 14. As a consequence the axial length of the male member which is compressed extends from the surface 7 to the load bearing turns of the thread in portion 14. Thus there is a substantially greater axial length and therefore volume the male member which is compressed and a correspondingly greater axial length and volume of the female member which is tensioned than with the known connector, which has the result that a substantially greater amount of energy is stored in the free end of the male member and in the corresponding tensioned part of the female member, and that the members will have been rotated through a substantially greater angle to achieve loading of the surfaces 7, 8. Furthermore, the maximum load on the leading flanks of any particular turn of the threads is reduced as compared with the loads on the leading flanks of the turns of the threads of the known connector, which substantially reduces the risks of galling of the surfaces.

The threads 4, 6 of the connector of FIG. 3 may be dimensioned to have an interference fit between the crest surface of one thread and root surface of the other thread but the degree of interference can be reduced to zero or a clearance may be provided. Advantageously the crest surface of one thread and root surface of the other thread are at least in contact, a clearance being provided between the crest surface of the other thread and the root surface of the one thread.

When the members of the connector of FIG. 3 are fully engaged, if the connector is not subject to any axial tensile forces, the turns of the threads 4, 6 in portion 16 have little effect. However, if the connector is subject to a tensile force, the load is not only sustained by some of the turns e.g. turns 4i, 4j and 6i, 6j of the threads at the end of the other end portion 16, but also by the turns of the threads in the intermediate portion 14 and by some of the turns of the threads in portion 15, as shown by the full line 18 in FIG. 4. Because part of the load is taken by the turns of the threads in portions 14 and 15, the turns of the threads in portion 16 are less highly loaded and this has particular advantage where either the male or the female thread in this portion is a "vanishing" thread of progressively reducing radial extent, because it reduces the tendency of the female member to deform outwardly under load.

One or, as shown, two annular recesses 19, 20 may be provided in the female and/or the male members at one or both of the junctions between portions 14, 15 and 14, 16 respectively or elsewhere. These recesses may be provided with annular seals of resiliently compressible material, for example Teflon, against which turns of the other threads bear.

Figure 5:
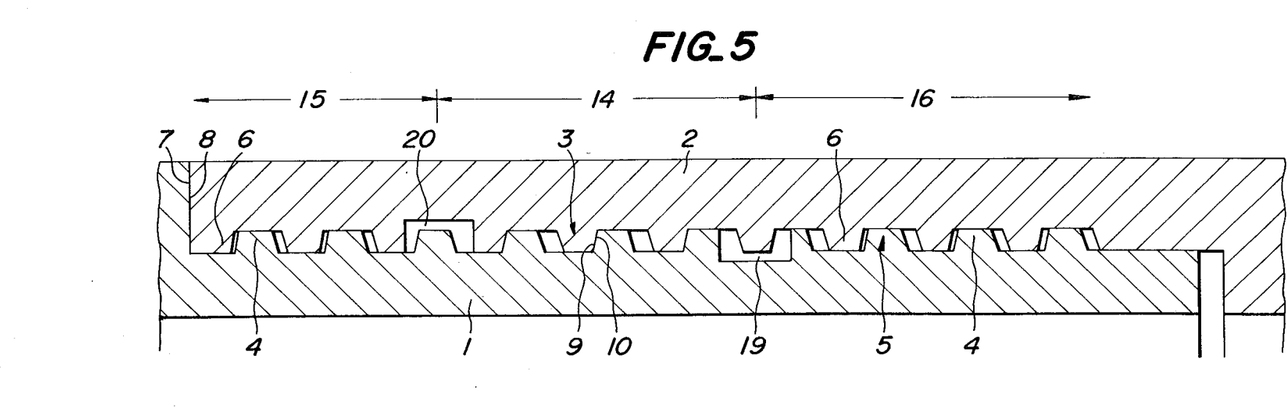
FIG. 5 is a diagrammatic part sectional view of another embodiment of pipe connector according to the present invention.

While in the above described connector, the sealing surfaces 7, 8 are provided at the free end of the male member and internally in the female member, they may alternatively be provided between the free end of the female member and externally on the male member, as shown in FIG. 5. In FIG. 5, like parts have been given the same reference numerals and the same thread phase changes are involved in portions 14, 15 and 16 but in effect the phase change applied to the male member (which is the member placed under compression on make-up) in FIG. 3 is applied to the female member (which is the member placed under compression on make-up) in FIG. 5 and vice versa.

It will be appreciated that the threads 4, 6 are shown very diagrammatically in FIGS. 1, 3 and 5.

Figure 6:
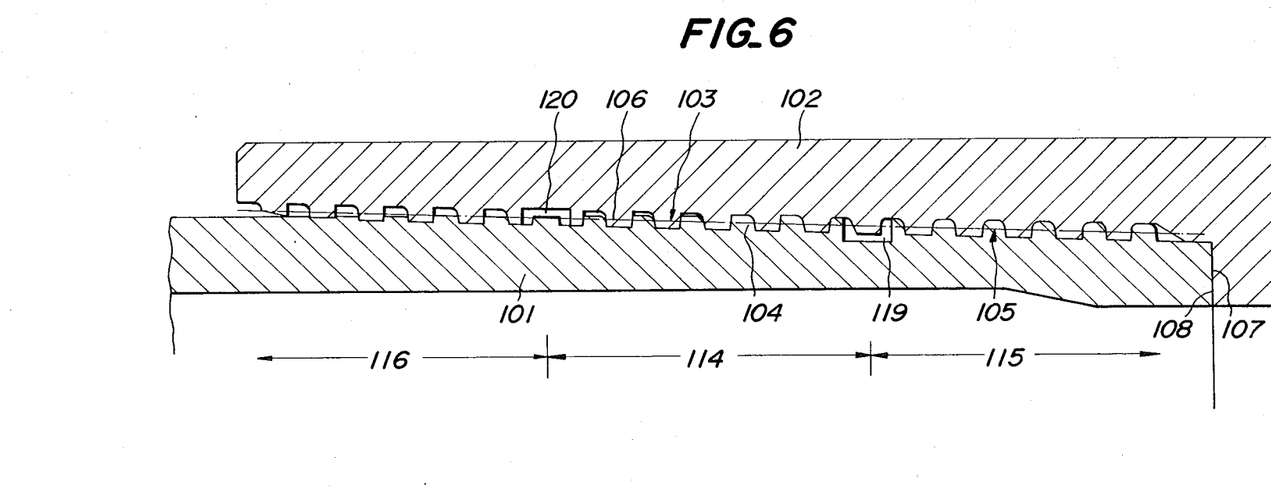
FIG. 6 is a part sectional view of a further embodiment of pipe connector according to the present invention.
Figure 7:
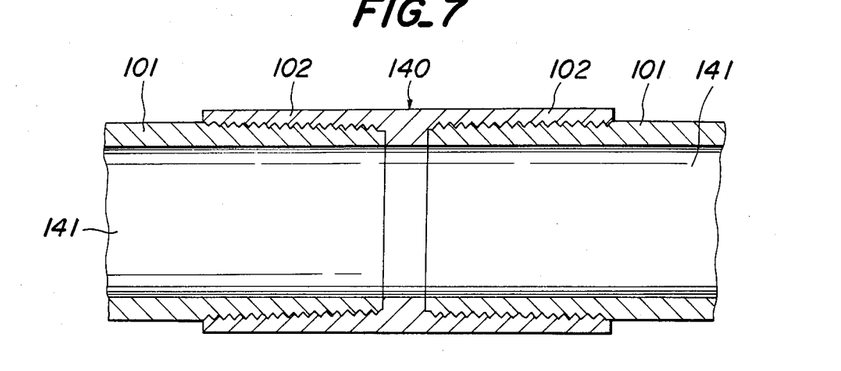
FIG. 7 is a diagrammatic sectional view of the connector of FIG. 6.

FIG. 6 shows more realistically the male member 101 and female member 102 of a preferred embodiment of pipe connector of the type shown in FIG. 7 in which the female member 102 comprises a sleeve 140 having a female member 102 at each end, each for engagement with a male member 101 which is made or formed integrally with a respective pipe 141. As shown in FIG. 6, the male member has a radial sealing surface 107 at its free end and a thread 104 formed on an external circumferential frusto-conical surface 103. The thread comprises, in this particular embodiment, eighteen turns of which the last five at either end fall in end portions 115 and 116 respectively, the central five turns falling in central portion 114. The portions 114, 115 and 116 of the thread 104 have the same pitch throughout but at the junction between portions 114 and 115 the phase of the thread is changed to advance the phase in portion 115 relative to that of portion 114, and an annular groove 119, which may be provided with an annular seal (not shown), is formed between portions 114 and 115. The thread in portion 116 at least is a vanishing thread in which the radial dimensions of the turns progressively reduce, the crest surfaces of the turns lying on a cylinder. The crest surfaces of the remainder of the turns on the thread lie on a frusto-conical surface, as do the root surface of the gaps between adjacent turns of the threads, for the full extent of the thread. These frusto-conical surfaces have the same cone angle.

As regards the female member 102, it is provided with radial sealing surface 108, and a circumferential internal frusto-conical surface 105 which is provided with a thread 106 which, as with the thread of the male member, is divided into portions 114, 115 and 116. The portions 114, 115 and 116 of the thread 106 have the same pitch throughout, which is the same as the pitch of portions 114, 115 and 116 of thread 104 but, between portions 114 and 116 of thread 106 there is a phase change to advance the phase of the thread of portion 116, and at this change there is an annular groove 120 which may be provided with a resiliently compressible annular seal. The thread on the female member 102 has a constant radial extent throughout, the crest and root surfaces lying on frusto-conical surfaces having the same concity as the frusto-conical surfaces of the male member.

Figure 8:
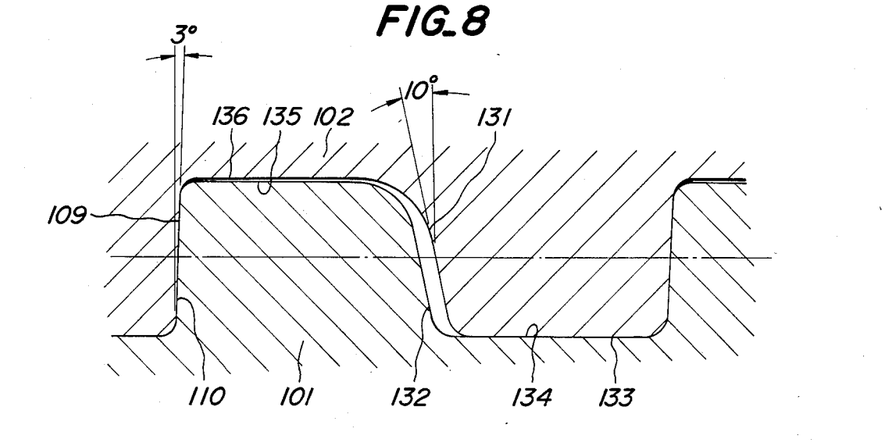
FIG. 8 is an enlarged view of an embodiment of thread used in the connector of FIG. 6.

A preferred form of the thread of the connector of FIG. 6 is shown in FIG. 8. As shown, the leading flanks 109 and 110 of the threads have a very slight inclination, for example 3°, to the radial plane and the trailing flanks 131, 132 may have a greater inclination, for example of the order of 10°. The width of the thread is greater than its height and the relative dimensions of width and height may be based on an API standard buttress thread. The width of the thread is selected in relation to the width of the gap between adjacent turns of the other thread such that there is always clearance between surfaces 131 and 132 during make-up. The radial extent of each thread in relation to the radial extent of the corresponding gap between adjacent turns of the other thread is arranged so that the crest surface 134 of the thread of the female member at least contacts, and may have an interference fit with, the root surface 133 of the gap between adjacent turns of the thread of the male member. This ensures that contact or interference is maintained over the full length of the threaded surfaces, despite the fact that the thread 104 of the male member is vanishing in portion 116. Alternatively a clearance may be provided between surfaces 133, 134. There is a slight clearance between the crest and root surfaces 135 and 136 of the thread of the male member and of the female member respectively.

Advantageously the threads in the male and female members are made using full width cutting tools which cut out a constant axial width gap between the turns of the threads along the full length of each threaded surface. To obtain the phase changes, which are both phase advances, at the junction between portions 114 and 116 of the female member 106 and portions 114 and 115 of the male member 104, the rate of axial advance of the tool relative to the member is momentarily increased to locally increase the pitch and produce the required phase change. Where a phase retardation is required, the rate of axial advance of the tool relative to a member is momentarily reduced to locally reduce the pitch. The grooves 119 and 120 if provided are cut using another tool.

In the above described embodiments, the threaded surfaces 3, 5 and 103, 105 of the members are described as being frusto-conical. It will be appreciated that these surfaces may alternatively be cylindrical. Additionally, it will be appreciated that the number of turns of the threads on the members will depend on the members and the loads which they have to sustain and are variable as required. Similarly, the number of turns of the threads in each of the three portions of the threaded surfaces may be varied to optimize the required effects.

While as described, the sealing surfaces 7, 8 and 107 and 108 are radial surfaces, it will be appreciated that these may take other forms, the main requirement being that they be generally axially directed so as to be subject to axial forces to urge them into sealing contact. They may for example be frusto-conical surfaces or comprise two frusto-conical surfaces of opposite conicity which merge together with a generally V-section radial profile. Alternatively, they may be curved, for example convex or concave, or in part radial and/or frusto-conical and/or curved. Additionally, the surfaces may initially have different shapes and, with axial compression, may be deformed to the same general shape. The surfaces may also be deformed to the same general shape. The surfaces may also be provided with one or more grooves provided with sealing rings or may be coated with a sealing material, such as Teflon, to improve the seal provided thereby. They may, for example, have the forms described in copening U.K. Patent Application No. 8414203.

Figure 9:
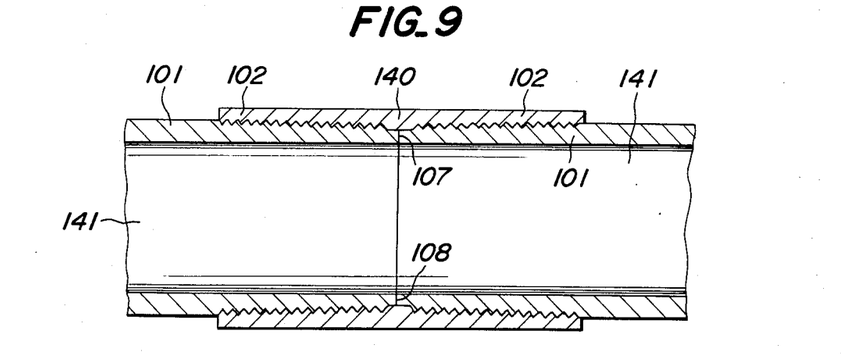
FIG. 9 is a diagrammatic sectional view of yet another embodiment of connector according to the present invention.

While as described above, surface 8 or 108 on the female member is shown as being formed integrally therewith, this surface may be provided by another member, which is permanently or releasably fixed to the female member. For example, as shown in FIG. 9, which shows an arrangement similar to that shown in FIG. 7 with a sleeve 140 providing two female members 102 each engageable with a male member 101, the sealing surfaces 107 of the male members seal against each other. Considering either of these surfaces 107, the sealing surface 108 of the female member is then considered to be provided by the surface 107 of the other male member which has previously been engaged with the sleeve 118. In this embodiment the sealing surfaces 7, 8, 107, 108 may have the forms described in copending U.K. application No. 8323508.

It will also be appreciated that the above described connector is applicable to other types of pipe connectors, such as pin and box type connectors where both the male member and the female member are made or formed integrally with a pipe, and to connecting other tubular or solid elongate, e.g. cylindrical members, such for example as structural tubular members, pile driving pipe strings, drill collars and tool joints.

For use in connecting pipes for conveying pressurized fluids, such as oil or gas or steam, and in oil or gas exploration and production, the male member is formed integrally on the end of a metal tubular member and the female member is also made of metal and formed integrally on the end of a metal tubular member or as part of a sleeve. The metal may be steel, for example high tensile steel. Where the connector is used for conveying a corrosive fluid which contacts both members, they are advantageously both made of the same material. Where contact between the fluid conveyed and both members does not occur, as for example in the embodiment of FIG. 9, the material of the female member may be a higher grade than that used for the male member so that the overall dimensions of the female member can be reduced.

Although as described above, each member is provided with a single start thread, the members may be provided with multistart threads. Additionally, although the threads illustrated are buttress threads, it will be appreciated that other suitable forms of threads may be used.

Figure 10A:
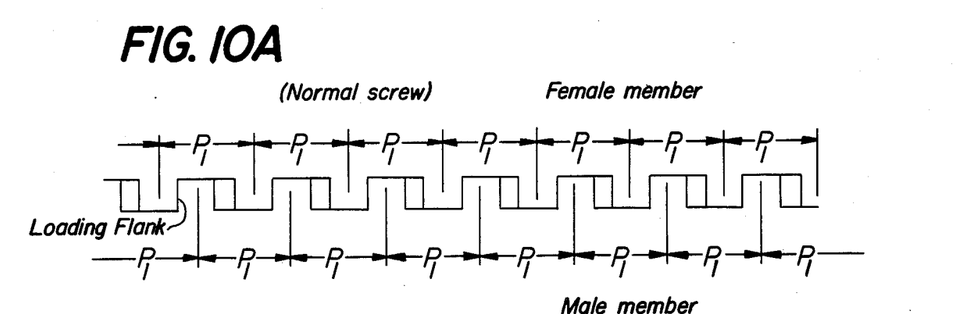
FIGS. 10A, 10B, and 10C are diagrammatic part-sectional views of M/F screw threads illustrating the normal state, a change of phase and a change of pitch, respectively.
Figure 10B:
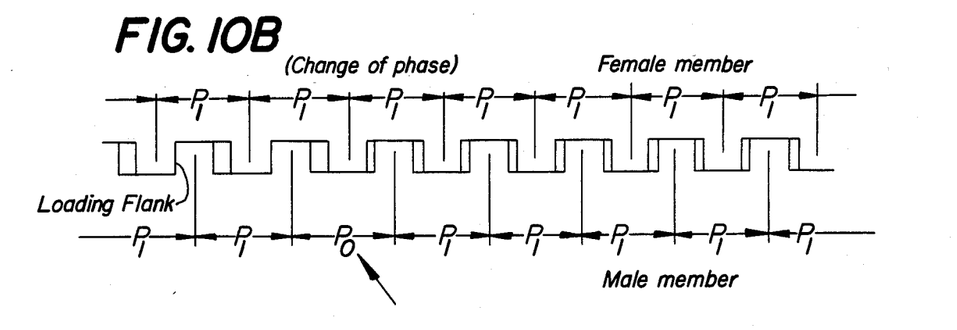
Figure 10C:
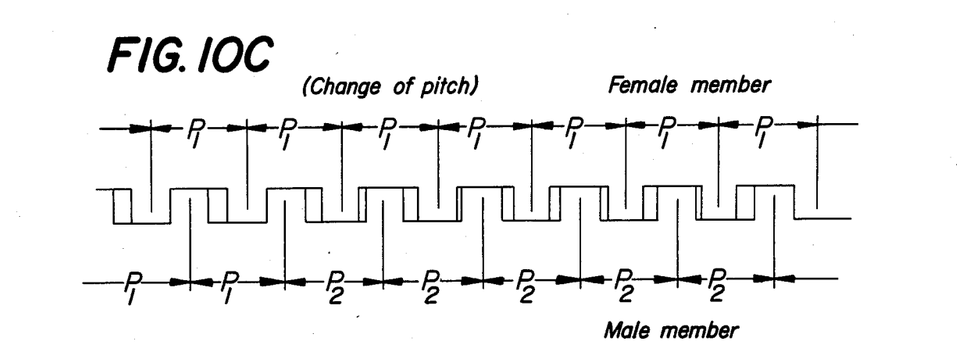

FIGS. 10A–10C illustrate and clarify the "change of phase" feature of the invention as disclosed and related to hereinabove.

These Figures illustrate screw threads in the form of saw-teeth having rectangular cross-sections.

FIG. 10A shows a normal screw thread engagement of male and female members. The pitch $p_1$ is constant over all the screw threads, the pitch being illustrated by a distance between centers of crests.

Also, the gaps and clearances between threads of both male and female members are substantially constant.

FIG. 10B illustrates the female member having the constant pitch $p_1$ throughout its length, and being quite similar to that shown in FIG. 10A.

However, the male member is shown in FIG. 10B to have a different Po at one location but having the same pitch $p_1$ at the other locations. This constitutes the "change of phase" discussed hereinabove.

The change of phase means change in pitch only at one or more locations, but the pitch is maintained constant at the other locations, or in portions.

In a change of phase, gaps or clearances, created by the phase change, between threads or at loading flanks, are also substantially constant (the loading flank means the surface subjected to the axial force):

$$\text{Gaps} = \text{pitch} \times (\theta/360)$$

where $\theta$ is different in phase. As the pitch after the phase has been changed is constant ($p_1$ as shown in FIG. 10B), the gaps are also constant.

FIG. 10C illustrates a "change of pitch". In this Figure, the female member has the constant pitch $p_1$ all over the length thereof. However, the male member has the constant pitch $p_1$ only at its left end portion and has a different constant pitch $p_2$ at the right portion thereof.

In a change of pitch, gaps and clearances at loading flanks are progressively changed (increaded or decreased) throughout the portion of the pitch $p_2$.

If the pitch $p_1$ is changed to pitch $p_2$, and n is the number of screw threads counted from the location where the pitch is changed, $$\text{Gaps} = n \times (p_1 - p_2).$$

Accordingly, the gaps change in proportion to n.

As can be seen from FIG. 10B, the change of phase is obtained by changing the pitch $p_1$ at one location. Accordingly, the change of phase is a consequence of a local change in the pitch.

In order to obtain the change of phase, therefore, a tool for cutting the screw may be fed by a distance per one revolution larger than the pitch $p_1$ (See Page 18, Lines 9–17, hereinabove). The rate of axial advance of the tool is momentarily increased to locally increase the pitch.

What is claimed is:

1. A pipe connector including a female member having an internal circumferential surface provided with a thread, and a male member having an external circumferential surface provided with a thread for threaded engagement with the thread of the female member, the male member being provided adjacent one end of the threaded surface thereof with an annular sealing surface which lies in a plane substantially perpendicular to a central axis of a connection of the male and female members, when the male and female members are fully engaged together, and which is brought under an axially directed force into sealing abutment with an annular sealing surface associated with the female member, which lies in a plane substantially perpendicular to the central axis of the connection of the male and female members, when the members are fully engaged together, wherein the threads of the members comprise an intermediate portion intermediate the ends of the threads, and one end portion extending between the intermediate portion and the one ends of the threads adjacent the sealing surfaces, wherein the intermediate and one end portions of the threads have the same pitch throughout their axial extents, but the relative phase of threads of the members changes between the intermediate portion and the one end portion such that, as the members are screwed together, on abutment of the sealing surfaces, part at least of one leading flank of the thread of one member abuts the corresponding part of the leading flank of the thread of the other member in the intermediate portion, and as the axial force on the sealing surfaces increases, the leading flanks of the threads of the members in the intermediate portion are progressively loaded and the leading flanks of the threads of the members in the one end portion are progressively brought into abutment and loaded.

2. A pipe connector as set forth in claim 1, wherein the threads of the members comprise another end portion between the intermediate portion and the other ends of the threads, the pitch of the threads in the other end portion being the same as that of the threads in the intermediate and one end portions but the relative phase of the threads of the members changes between the intermediate portion and the other end portion such that, when the members are fully engaged together and subject to a tensile load, a substantial part of the tensile load is sustained by the threads in the intermediate portion.

3. A pipe connector including a female member having an internal circumferential surface provided with a thread, and a male member having an external circumferential surface provided with a thread for threaded engagement with the thread of the female member, the male member being provided adjacent one end of the threaded surface thereof with an annular sealing surface which lies in a plane substantially perpendicular to a central axis of a connection of the male and female members, when the male and female members are fully engaged together, and which is brought into abutment with an annular sealing surface associated with the female member, which sealing surface lies in a plane substantially perpendicular to the central axis of the connection of the male and female members, when the members are fully engaged together, under an axially directed force which places part at least of one member in compression and part at least of the other member in tension, wherein the threads of the members comprise an intermediate portion intermediate the ends of the threads, and one end portion extending between the intermediate portion and the one ends of the threads adjacent the sealing surfaces, the pitch of the threads of the members in the intermediate and one end portions are the same and constant throughout their axial extents but, in the one end portion, the phase of the thread of the one member is advanced relative to that of the other member.

4. A pipe connector as set forth in claim 3, wherein the threaded surfaces of the members comprise another end portion between the intermediate portion and the other ends of the threads, the pitch of the threads in the other end portion being the same as that of the threads in the intermediate portion but, in the other end portion, the phase of the thread of the other member is advanced relative to that of the one member.

5. A pipe connector as set forth in claim 1 or 3, wherein the phase of the thread in the intermediate and one end portion of one of the members is maintained constant and the phase of the thread of the other of the members in the one end portion is changed relative to the phase of the thread of the intermediate portion of that member.

6. A pipe connector as set forth in claim 2 or 4, wherein the phase of the thread in the intermediate and other end portion of one of the members is maintained constant and the phase of the thread of the other of the members in the other end portion is changed relative to the phase of the thread of the intermediate portion of that member.

7. A pipe connector as set forth in claim 1 or 3, wherein the phase between adjacent portions of the thread of a member is changed by locally changing the pitch of the thread between the adjacent portions.

8. A pipe connector as set forth in claim 1 or 3, wherein the circumferential surfaces of the members are cylindrical.

9. A pipe connector as set forth in claim 1 or 3, wherein the circumferential surfaces of the members are frusto-conical, the frusto-conical surface of the male member tapering outwardly thereof and the frusto-conical surface of the female member tapering inwardly thereof.

10. A pipe connector as set forth in claim 1 or 3, wherein the sealing surface associated with the female member is provided by a surface of the female member itself.

11. A pipe connector as set forth in claim 1 or 3, wherein the sealing surface associated with the female member is provided by a surface of another member engaged with the female member.

12. A pipe connector as set forth in claim 1 or 3, wherein the sealing surface of the male member is provided in the region of the free end thereof and the sealing surface associated with the female member is provided internally thereof.

13. A pipe connector as set forth in claim 1 or 3, wherein the sealing surface of the male member is provided by an external surface thereon and the sealing surface associated with female member is provided by a surface of the female member in the region of the free end thereof.

14. A pipe connector as set forth in claim 1 or 3, wherein the threads of the members are shaped to provide, on full engagement of the members, a clearance between the other trailing flanks of the threads.

15. A pipe connector as set forth in claim 1 or 3, wherein the threads of the members are shaped to provide, on full engagement of the members, a clearance between a crest surface of each thread and a corresponding root surface of the gap between adjacent turns of the other threads.

16. A pipe connector as set forth in claim 1 or 3, wherein the threads of the members are shaped to provide, on full engagement of the members, contact between a crest surface of one of the threads and a root surface of the gap between adjacent turns of the othe thread, and clearance between a crest surface of the other thread and a root surface of the gap between adjacent turns of the one thread.

17. A pipe connector as set forth in claim 1 or 3, wherein the threads of the members are shaped to provide, on full engagement of the members, an interference fit between a crest surface of one of the threads and a root surface of the gap between adjacent turns of the other one of the threads, and a clearance between a crest surface of the other thread and a root surface of the gap between adjacent turns of the one thread.

18. A pipe connector as set forth in claim 1 or 3, wherein intermediate the ends of the threads of the members, the threaded surface of one of the members is provided with an annular groove housing a resiliently compressible annular seal against which the thread of the other member seals.

19. A pipe connector as set forth in claim 18, wherein the annular groove is provided in the female member in the region of an end of the intermediate portion of the thread thereof.

* * * * *